United States Patent
Hicks et al.

(10) Patent No.: US 11,099,975 B2
(45) Date of Patent: Aug. 24, 2021

(54) TEST SPACE ANALYSIS ACROSS MULTIPLE COMBINATORIC MODELS

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 16/256,179

(22) Filed: Jan. 24, 2019

(65) Prior Publication Data

US 2020/0242016 A1 Jul. 30, 2020

(51) Int. Cl.
*G06F 11/36* (2006.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
USPC ........................................................ 714/38.1
See application file for complete search history.

(56) References Cited

U.S. PATENT DOCUMENTS

| | | |
|---|---|---|
| 5,153,881 A | 10/1992 | Bruckert |
| 5,185,877 A | 2/1993 | Bissett |
| 5,410,634 A | 4/1995 | Li |
| 5,694,540 A | 12/1997 | Humelsine |

(Continued)

FOREIGN PATENT DOCUMENTS

| | | |
|---|---|---|
| JP | H05282272 A | 10/1993 |
| JP | H07121498 A | 5/1995 |
| JP | H07139507 A | 5/1995 |
| WO | 2016138953 A1 | 9/2016 |
| WO | 2018162048 A1 | 9/2018 |

OTHER PUBLICATIONS

"CPC Cooperative Patent Classification, G06F Electrical Digital DAT Processing" of Apr. 2015, retrieved from https://www.cooperativepatentclassification.org/cpc/ (Year: 2015).*
"All pair testing" wikipedia page from date Sep. 14, 2017, retrieved using the WayBackMachine, from https://web.archive.org/web/20170914145543/https://en.wikipedia.org/wiki/All-pairs_testing (Year: 2017).*

(Continued)

*Primary Examiner* — Yair Leibovich
(74) *Attorney, Agent, or Firm* — Cantor Colburn LLP; Teddi Maranzano

(57) ABSTRACT

A method includes defining functional coverage by a first test suite based on a first functional coverage model of a System Under Test (SUT). The first test suite includes a first plurality of tests. The first functional coverage model includes a first plurality of attributes. The first functional coverage model defines possible combinations of values of the first plurality of attributes. Functional coverage by a second test suite is defined based on a second functional coverage model which includes a second plurality of attributes. The second functional coverage model defines possible combinations of values of the second plurality of attributes. Subsets of the first and second plurality of attributes are determined. The subsets of attributes include exclusively common attributes between the first and the second plurality of attributes. A subset of the tests is selected. The selected subset is operative to cover the first and second subsets of the attributes.

20 Claims, 4 Drawing Sheets

(56) References Cited

U.S. PATENT DOCUMENTS

| | | |
|---|---|---|
| 5,758,061 A | 5/1998 | Plum |
| 5,758,062 A | 5/1998 | McMahon |
| 6,182,245 B1 | 1/2001 | Akin et al. |
| 6,182,258 B1 | 1/2001 | Hollander |
| 6,378,097 B1 | 4/2002 | Fin et al. |
| 6,415,396 B1 | 7/2002 | Singh et al. |
| 6,601,018 B1 | 7/2003 | Logan |
| 6,718,286 B2 | 4/2004 | Rivin et al. |
| 6,718,485 B1 | 4/2004 | Reiser |
| 6,859,922 B1 | 2/2005 | Baker |
| 6,907,546 B1 | 6/2005 | Haswell et al. |
| 7,024,589 B2 | 4/2006 | Hartman et al. |
| 7,032,212 B2 | 4/2006 | Amir et al. |
| 7,093,238 B2 | 8/2006 | Givoni |
| 7,178,063 B1 | 2/2007 | Smith |
| 7,235,358 B2 | 6/2007 | Wohlgemuth |
| 7,315,634 B2 | 1/2008 | Martin |
| 7,363,495 B2 | 4/2008 | Wells |
| 7,386,839 B1 | 6/2008 | Golender |
| 7,552,425 B2 | 6/2009 | Bates et al. |
| 7,596,778 B2 | 9/2009 | Kolawa |
| 7,617,074 B2 | 11/2009 | Beish |
| 7,640,470 B2 | 12/2009 | Lammel |
| 7,721,265 B1 | 5/2010 | Xu |
| 7,752,502 B2 | 7/2010 | Clee |
| 7,861,226 B1 | 12/2010 | Episkopos |
| 7,945,898 B1 | 5/2011 | Episkopos et al. |
| 7,958,400 B2 | 6/2011 | Ur |
| 7,962,798 B2 | 6/2011 | Locasto |
| 8,056,060 B2 | 11/2011 | Bicheno |
| 8,225,194 B2 | 7/2012 | Rechsteiner |
| 8,234,105 B1 | 7/2012 | Aldrich |
| 8,296,445 B1 | 10/2012 | Hackborn |
| 8,296,605 B2 | 10/2012 | John |
| 8,301,757 B2 | 10/2012 | Catlin |
| 8,370,816 B2 | 2/2013 | Farchi et al. |
| 8,479,171 B2 | 7/2013 | Ghosh |
| 8,504,997 B2 | 8/2013 | Tkachuk et al. |
| 8,527,813 B2 | 9/2013 | Budnik |
| 8,549,480 B2 | 10/2013 | Cohen et al. |
| 8,554,811 B2 | 10/2013 | Mariani |
| 8,649,995 B2 | 2/2014 | Thulasidasan et al. |
| 8,666,723 B2 | 3/2014 | Xie |
| 8,694,958 B1 | 4/2014 | Potter |
| 8,756,460 B2 * | 6/2014 | Blue .................. G06F 11/3676 |
| | | 714/38.1 |
| 8,775,886 B2 | 7/2014 | Mellen |
| 8,806,450 B1 | 8/2014 | Maharana |
| 8,856,129 B2 | 10/2014 | Cai |
| 8,874,477 B2 | 10/2014 | Hoffberg |
| 8,935,673 B1 | 1/2015 | Ashkenazi |
| 8,949,674 B2 | 2/2015 | Mancoridis |
| 8,954,926 B2 | 2/2015 | Braun et al. |
| 8,954,930 B2 | 2/2015 | Kamenz |
| 8,966,453 B1 | 2/2015 | Zamfir |
| 8,997,061 B1 | 3/2015 | Davison |
| 9,009,538 B2 | 4/2015 | D'Alterio et al. |
| 9,037,915 B2 | 5/2015 | D'Alterio et al. |
| 9,098,635 B2 | 8/2015 | Peri-Glass et al. |
| 9,104,804 B2 | 8/2015 | Best |
| 9,111,033 B2 | 8/2015 | Bates |
| 9,141,520 B2 | 9/2015 | Zheng |
| 9,202,005 B2 | 12/2015 | Goswami et al. |
| 9,286,313 B1 | 3/2016 | Sharangpani |
| 9,317,410 B2 | 4/2016 | Eilam et al. |
| 9,336,122 B2 | 5/2016 | Kilzer et al. |
| 9,454,466 B2 | 9/2016 | Ivrii et al. |
| 9,489,289 B2 | 11/2016 | Hu |
| 9,513,998 B2 | 12/2016 | Coronado |
| 9,529,701 B2 | 12/2016 | Ekambaram et al. |
| 9,600,241 B2 | 3/2017 | Shankar et al. |
| 9,600,401 B1 | 3/2017 | Haischt et al. |
| 9,600,403 B1 | 3/2017 | Raz |
| 9,626,277 B2 | 4/2017 | Thangamani |
| 9,720,766 B2 | 8/2017 | Lee |
| 9,734,263 B2 | 8/2017 | Kohavi et al. |
| 9,779,013 B2 | 10/2017 | Narayan et al. |
| 9,857,959 B2 | 1/2018 | Dhawal |
| 9,864,675 B2 | 1/2018 | Ug |
| 9,916,414 B2 | 3/2018 | Jeong |
| 9,990,272 B2 | 6/2018 | Cooper |
| 9,996,452 B2 | 6/2018 | Cooper et al. |
| 10,061,685 B1 | 8/2018 | White |
| 10,073,763 B1 | 9/2018 | Raman |
| 10,152,479 B1 | 12/2018 | Granstrom |
| 10,270,748 B2 | 4/2019 | Briceno et al. |
| 10,296,446 B2 | 5/2019 | D'Andrea et al. |
| 10,338,993 B1 | 7/2019 | Lekivetz et al. |
| 10,383,553 B1 | 8/2019 | Glenn |
| 10,417,282 B1 | 9/2019 | Zuber |
| 10,430,318 B1 | 10/2019 | Ansari |
| 10,545,855 B1 | 1/2020 | Jayaswal |
| 10,560,539 B1 | 2/2020 | Loch et al. |
| 10,637,853 B2 | 4/2020 | Lindemann |
| 10,713,151 B1 | 7/2020 | Zinger et al. |
| 10,754,756 B2 | 8/2020 | Ocariza, Jr. et al. |
| 10,776,464 B2 | 9/2020 | Wilson |
| 2003/0233600 A1* | 12/2003 | Hartman ........ G01R 31/318307 |
| | | 714/32 |
| 2004/0154001 A1 | 8/2004 | Haghighat et al. |
| 2006/0070048 A1 | 3/2006 | Li et al. |
| 2006/0179386 A1 | 8/2006 | Pushpavanam |
| 2008/0065931 A1 | 3/2008 | Coulter |
| 2008/0163165 A1 | 7/2008 | Shitrit |
| 2008/0172652 A1 | 7/2008 | Davia et al. |
| 2009/0249123 A1 | 10/2009 | Chow |
| 2010/0023928 A1 | 1/2010 | Hentschel et al. |
| 2010/0100871 A1 | 4/2010 | Celeskey |
| 2010/0287534 A1 | 11/2010 | Vangala et al. |
| 2011/0016457 A1 | 1/2011 | Artzi et al. |
| 2011/0145653 A1 | 6/2011 | Broadfoot |
| 2012/0191443 A1 | 7/2012 | Amalfitano |
| 2012/0253728 A1 | 10/2012 | Chamas |
| 2012/0260132 A1 | 10/2012 | Blue |
| 2013/0125090 A1 | 5/2013 | Durand et al. |
| 2013/0152047 A1 | 6/2013 | Moorthi |
| 2014/0013307 A1 | 1/2014 | Hansson |
| 2014/0059081 A1 | 2/2014 | Farchi et al. |
| 2014/0095933 A1 | 4/2014 | Griesinger |
| 2014/0372083 A1 | 12/2014 | Hsu et al. |
| 2015/0094997 A1 | 4/2015 | Ivrii et al. |
| 2015/0106653 A1 | 4/2015 | Adler et al. |
| 2015/0378879 A1 | 12/2015 | Ding |
| 2016/0140027 A1 | 5/2016 | Ug |
| 2016/0378618 A1 | 12/2016 | Cmielowski et al. |
| 2017/0060734 A1 | 3/2017 | Raz et al. |
| 2017/0103013 A1 | 4/2017 | Grechanik |
| 2017/0132119 A1 | 5/2017 | Xu et al. |
| 2017/0199810 A1 | 7/2017 | Hamilton |
| 2017/0262361 A1 | 9/2017 | Francis |
| 2017/0270035 A1 | 9/2017 | Nie |
| 2018/0024911 A1 | 1/2018 | Kruszewski et al. |
| 2018/0052725 A1 | 2/2018 | Hannson |
| 2018/0095867 A1 | 4/2018 | Varadarajan et al. |
| 2018/0121336 A1 | 5/2018 | Ayyappan et al. |
| 2018/0293156 A1 | 10/2018 | Zeng |
| 2018/0300226 A1 | 10/2018 | Manolios |
| 2018/0314577 A1 | 11/2018 | Gorjiara et al. |
| 2018/0329807 A1 | 11/2018 | Atyam |
| 2019/0018761 A1 | 1/2019 | Ramraz |
| 2019/0332523 A1 | 10/2019 | Gefen |
| 2019/0370274 A1 | 12/2019 | Yokoyama |
| 2020/0201822 A1 | 6/2020 | Wang |
| 2020/0213199 A1 | 7/2020 | Sethi |
| 2020/0242011 A1 | 7/2020 | Hicks |
| 2020/0242012 A1 | 7/2020 | Hicks |
| 2020/0242013 A1 | 7/2020 | Hicks |

OTHER PUBLICATIONS

Anonymous, "A Method and System for Providing Collaborative Platform as a Service for Aiding Machine Learning Development," IP.com (IPCOM000256095D). Nov. 2, 2018. 5 pages.

(56) References Cited

OTHER PUBLICATIONS

Anonymous, "Black Hole Testing—Machine Learning Program Behavior Patterns from Massive Automated Test Results," IP.com (IPCOM000243987D). Nov. 4, 2015. 8 pages.
Anonymously Disclosed "A system and method for setting breakpoints automatically by comparing correct and incorrect runs" IP.com No. IPCOM000252399D, Publication Date: Jan. 8, 2018, 5 pages.
Anonymously Disclosed "Advanced Interrogative Debugger for data-centric domain", IP.com No. IPCOM000226865D, Publication Date: Apr. 23, 2013, 14 pages.
Anonymously Disclosed "Cognitive, Self-Instrumenting Code on Detection of an Issue" IP.com No. IPCOM000253277D; Publication Date: Mar. 19, 2018; 4 pgs.
Anonymously Disclosed "Method and system to find potential program defect based on run-time variable change analysis", IP.com No. IPCOM000248699D, Publication Date: Dec. 28, 2016, 8 pages.
Anonymously Disclosed "Method for a debugging tool for finding variable value in application stack", IP.com No. IPCOM000209789D, Publication Date: Aug. 15, 2011, 5 pages.
Anonymously Disclosed "Method to enable debugger breakpoint inside statement", IP.com No. IPCOM000206941D, Publication Date: May 13, 2011, 8 pages.
Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tubingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated as Related; Date Filed: Jul. 11, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification ", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
Bromme et al., "A Conceptual Framework for Testing Biometric Algorithms within Operating Systems' Authentication", ACM, pp. 273-280 (Year: 2002).
Rothermel et al., "Analyzing Regression Test Selection Techniques", IEEE, pp. 529-551 (Year: 1996).
Wikipedia "Cartesian Product" web page, from date Jan. 15, 2019, retrieved from https://web.archive.org/web/20190115231627/https://en.wikipedia.org/wiki/Cartesian_product (Year: 2019).
Anderson et al., "Customized Regression Testing Using Telemetry Usage Patterns", IEEE, pp. 572-581 (Year: 2016).
Yan et al., "Regression From Uncertain and Its Applications to Soft Biometrics", IEEE, pp. 698-708 (Year: 2008).
Trokielewicz, "Linear Regression Anaylsis of Template Aging in Iris Biometrics", IEEE, pp. 1-6T (Year: 2015).
Andalib et al., "A Novel Key Generation Scheme for Biometric Cryptosystems Using Fingerprint Minutiae," IEEE, pp. 1-6 (Year: 2013).
Anonymous, "Combining Combinatorial Models while Maintaining Full Coverage," Jun. 25, 2016, 5 Pages.
Anonymous, "Explaining a Combinatorial Test Plan Using Hole Analysis" May 20, 2012; 4 pages.
Anonymous, "Integration of Combinatorial Testing Design with Automated Testing to Develop Smart Automated Test Suites," Jan. 6, 2015, 3 pages.

(56) References Cited

OTHER PUBLICATIONS

Anonymous, "Method and System for Optimizing Combinatorial Test Design (CTD) to Test a Mobile Application in Different Devices," Feb. 10, 2015, 2 pages.
Biswas, "Network-on-Chip Intellectual Property Protection Using Circular Path-based Fingerprinting," ACM, pp. 1-22 (Year: 2020).
Bryant et al., "Verification of Arithmetic Circuits with Binary Moment Diagrams," Proceedings of the 32nd ACM/IEEE design automation conference, 535-541, 1995.
Bures et al., "Tapir: Automation Support of Exploratory Testing Using Model Reconstruction of the System Under Test," IEEE, pp. 557-580 (Year: 2018).
Chakrabarti et al., "Specification Based Regression Testing Using Explicit State Space Enumeration," IEEE, pp. 1-6 (Year: 2006).
Chua, "Resistance switching memories are memristors," Applied Physics A, vol. 102, No. 4, 2011, pp. 765-783.
Esmaeili et al., "A Robust and Fast Video Copy Detection System Using Content-Based Fingerprinting," pp. 213-226 (Year: 2011).
Fang et al., "Identifying Test Refactoring Candidates with Assertion Fingerprints," ACM, pp. 125-137 (Year: 2015).
Fujita et al., "Multi-Terminal Binary Decision Diagrams: An Efficient Data Structure for Matrix Representation," Formal Methods in System Design—FMSD, vol. 10, No. 2/3, pp. 149-169, 1997.
Giugno et al., "GraphGrep: A Fast and Universal Method for Querying Graphs," IEEE, pp. 112-115 (Year: 2002).
Graves et al., "An empirical study of regression test selection techniques," ACM Trans. Softw. Eng. Methodol., 184-208 (2001).
Grindal et al., "Combination testing strategies: a survey," Softw. Test. Verif. Reliab. 15(3), 167-199 (2005).
Gu et al., "Multi-Aspect, Robust, and Memory Exclusive Guest OS Fingerprinting," IEEE, pp. 380-394 (Year: 2014).
IBM, Method of preventing build failures by searching through levels in a multi-level revision control system IP.com No. IPCOM000179779D, Publication Date: Feb. 25, 2009, 3 pages.
Jain et al., "Fingerprint Matching," IEEE, pp. 36-44 (Year: 2010).
Kuhn, R., "Practical Applications of Combinatorial Testing," Mar. 2012.
Lehmann et al., "A Generic Systolic Array Building Block for Neural Networks with On-Chip Learning," IEEE Transactions on Neural Networks, vol. 4., No. 3, 1993, pp. 400-407.
Li et al., "Training itself: Mixed-signal training acceleration for memristor-based neural network," 19th Asia and South Pacific Design Automation Conference (ASP-DAC), 2014, pp. 361-366.
Maughan, C., "Test Case Generation Using Combinatorial Based Coverage for Rich Web Applications," 2012.
Memon, Atif M., and Qing Xie. "Studying the fault-detection effectiveness of GUI test cases for rapidly evolving software." IEEE transactions on software engineering 31.10 (2005): pp. 884-896. (Year: 2005).
Mishchenko, A., "An Introduction to Zero-Suppressed Binary Decision Diagrams," Proceedings of the 12th Symposium on the Integration of Symbolic Computation and Mechanized Reasoning, 2001.
Orso, A. et al., "Scaling regression testing to large software systems," ACM BIGSOFT Software Engineering Notes 29.6 (2004); pp. 241-251. (Year: 2004).
Pershin et al., "Solving mazes with memristors: A massively parallel approach," Physical Review E, vol. 84, No. 4, 2011, 046703, 6 pages.
Ratha et al., "A Real-Time Matching System for Large Fingerprint Databases," IEEE, pp. 799-813 (Year: 1996).
Shu et al., "Testing Security Properties of Protocol Implementations—a Machine Learning Based Approach," IEEE, pp. 1-8 (Year: 2007).
Snelick et al., "Multimodal Biometrics: Issues in Design and Testing," ACM, pp. 68-72 (Year: 2003).
Soudry et al., "Memristor-Based Multilayer Neural Networks With Online Gradient Descent Training," IEEE Transactions on Neural Networks and Learning Systems, 2015.
Taneja, Kunal, et al. "eXpress: guided path exploration for efficient regression test generation." Proceedings of the 2011 International Symposium on Software Testing and Analysis. 2011. pp. 1-11 (Year: 2011).
Tsai et al., "Adaptive-Scenario-Based Object-Oriented Test Frameworks for Testing Embedded Systems," IEEE, pp. 1-16 (Year: 2002).
Tsai et al., "Scenario-Based Object-Oriented Test Frameworks for Testing Distributed Systems," IEEE, pp. 1-7 (Year: 2000).
Wilmor, D. et al, "A safe regression test selection technique for database-driven applications." 21st IEEE International Conference on Software Maintenance (ICSM'05). IEEE, 2005, pp. 1-10 (Year: 2005).
Yi Qiuping, et al. "A synergistic analysis method for explaining failed regression tests." 2015 IEEE/ACM 37th IEEE International Conference on Software Engineering. vol. 1. IEEE, 2015.pp. 257-267 (Year: 2015).
Zhong et al., "TestSage: Regression Test Selection for Large-scale Web Service Testing," IEEE, pp. 430-440 (Year: 2019).

* cited by examiner

TEST SPACE ANALYSIS ACROSS MULTIPLE COMBINATORIC MODELS

BACKGROUND

The present invention relates to testing of a computer program and, more specifically, test space analysis across multiple combinatoric models.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase, a sample of all possible behaviors of the computerized device, also referred to as a System Under Test (SUT), is inspected. Dynamic verification which stimulates the SUT and is used to identify bugs may be utilized. Generally, dynamic verification is associated with the execution of the SUT (or simulation thereof), and dynamically checks its behavior. As opposed to static verification measures which analyze the SUT without executing it, such as model checking, formal verification, static code analysis, or the like, dynamic verification may include any of the following: test planning, test-generation, SUT simulation, testing of the SUT, coverage analysis, or the like.

Test selection is a technique for reducing the testing effort by selecting a subset of the existing tests to run while preserving a level of confidence in the coverage of the selected tests. What is needed is a method enabling selection of tests covering common attributes between two or more functional coverage models.

SUMMARY

Additional technical features and benefits are realized through the techniques of the present invention. Embodiments and aspects of the invention are described in detail herein and are considered a part of the claimed subject matter. For a better understanding, refer to the detailed description and to the drawings.

Embodiments of the present invention are directed to a computer-implemented method for identifying optimal tests across multiple functional coverage models. A non-limiting example of the computer-implemented method includes defining functional coverage by a first test suite based on a first functional coverage model of a System Under Test (SUT). The first test suite includes a first plurality of tests. The first functional coverage model includes a first plurality of attributes. Each of the first plurality of attributes has a set of possible values. The first functional coverage model defines possible combinations of values of the first plurality of attributes as covered by the first test suite. Functional coverage by a second test suite is defined based on a second functional coverage model of the SUT. The second test suite includes a second plurality of tests. The second functional coverage model includes a second plurality of attributes. Each of the second plurality of attributes has a set of possible values. The second functional coverage model defines possible combinations of values of the second plurality of attributes as covered by the second test suite. A first subset of the first plurality of attributes and a second subset of the second plurality of attributes are determined. The first subset of attributes and the second subset of attributes include exclusively common attributes between the first plurality of attributes and the second plurality of attributes. A subset of the first plurality of tests and the second plurality of tests is selected. The selected subset of the plurality of tests is operative to cover the first subset of the first plurality of attributes and the second subset of the second plurality of attributes.

Embodiments of the present invention are directed to a system for identifying optimal tests across multiple functional coverage models. A non-limiting example of the system includes a memory having computer-readable instructions and one or more processors for executing the computer-readable instructions. The computer-readable instructions include defining functional coverage by a first test suite based on a first functional coverage model of a System Under Test (SUT). The first test suite includes a first plurality of tests. The first functional coverage model includes a first plurality of attributes. Each of the first plurality of attributes has a set of possible values. The first functional coverage model defines possible combinations of values of the first plurality of attributes as covered by the first test suite. Functional coverage by a second test suite is defined based on a second functional coverage model of the SUT. The second test suite includes a second plurality of tests. The second functional coverage model includes a second plurality of attributes. Each of the second plurality of attributes has a set of possible values. The second functional coverage model defines possible combinations of values of the second plurality of attributes as covered by the second test suite. A first subset of the first plurality of attributes and a second subset of the second plurality of attributes are determined. The first subset of attributes and the second subset of attributes include exclusively common attributes between the first plurality of attributes and the second plurality of attributes. A subset of the first plurality of tests and the second plurality of tests is selected. The selected subset of the plurality of tests is operative to cover the first subset of the first plurality of attributes and the second subset of the second plurality of attributes.

Embodiments of the invention are directed to a computer-program product for identifying optimal tests across multiple functional coverage models, the computer-program product including a computer-readable storage medium having program instructions embodied therewith. The program instructions are executable by a processor to cause the processor to perform a method. A non-limiting example of the method includes defining functional coverage by a first test suite based on a first functional coverage model of a System Under Test (SUT). The first test suite includes a first plurality of tests. The first functional coverage model includes a first plurality of attributes. Each of the first plurality of attributes has a set of possible values. The first functional coverage model defines possible combinations of values of the first plurality of attributes as covered by the first test suite. Functional coverage by a second test suite is defined based on a second functional coverage model of the SUT. The second test suite includes a second plurality of tests. The second functional coverage model includes a second plurality of attributes. Each of the second plurality of attributes has a set of possible values. The second functional coverage model defines possible combinations of values of the second plurality of attributes as covered by the second test suite. A first subset of the first plurality of attributes and a second subset of the second plurality of attributes are determined. The first subset of attributes and the second subset of attributes include exclusively common attributes between the first plurality of attributes and the second plurality of attributes. A subset of the first plurality of tests and the second plurality of tests is selected. The selected subset of the plurality of tests is operative to cover the first subset of the first plurality of attributes and the second subset of the second plurality of attributes.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1A:
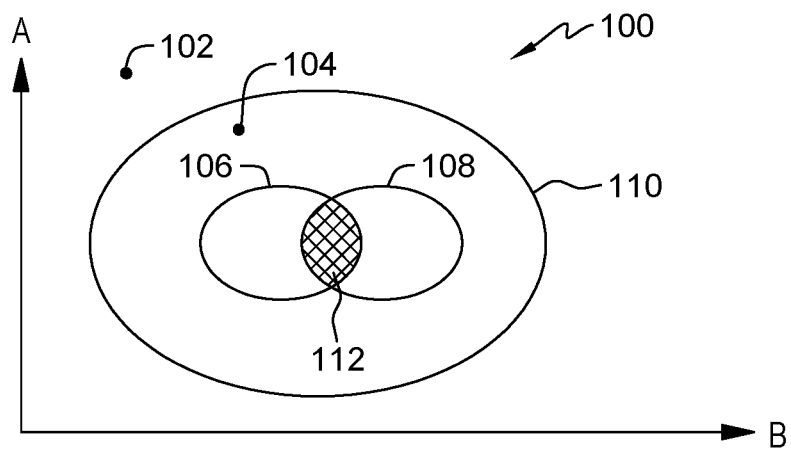
FIGS. 1A and 1B show diagrams of test spaces defined by various coverage models, in accordance with some exemplary embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention.

Coverage tools for checking software provide a measure of how well the software being evaluated has been exercised during testing and thereby give a level of assurance that the software is of high quality.

There are a number of types of coverage known in the art, such as statement coverage, line coverage, condition coverage, path coverage, method coverage, and the like. One additional coverage method is functional coverage. Functional coverage is designed to measure amount, portion or a similar metric of tests that examined predetermined functional behaviors. Once functional coverage is measured, quality assurance (QA) personnel may design additional tests to examine untested behaviors.

A functional coverage is measured with respect to a functional coverage model. The functional coverage model defines a triplet: functional attributes, a domain for each functional attribute, and a set of restrictions. The functional attributes may be any attribute of the SUT, such as for example a type of web browser being used, an underlying Operating System, a number of threads operating, whether the output was printed. The domains may define for each attribute a set of possible values. For example, the web browser may be Microsoft® Internet Explorer®, Google® Chrome®, or Mozilla Firefox™. Similarly, the operating system may be Microsoft® Windows®, or Linux™ The cross-product of the different combinations of the attributes defines a functional coverage test-space. The test-space comprises a set of coverage tasks, each representing functional requirements to be tested: one requirement per functional attribute and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks.

Test selection is a technique for reducing the testing effort by selecting a subset of the existing tests to run while preserving a level of confidence in the coverage of the selected tests. What is needed is a method enabling selection of tests covering common attributes between two or more functional coverage models One technical problem dealt with by the disclosed embodiments is to reduce a number of tests in a test suite (i.e., perform test selection). Another technical problem dealt with by the disclosed embodiments is to provide a comprehensive test suite that would provide sufficient coverage of a SUT. The comprehensive test suite comprising tests from an existing test suite and additional tests that are added in addition to those that existed in the test suite.

One technical solution is to reduce a size of a test suite while increasing efficiency of the test space.

A functional coverage model defines coverage tasks of the SUT as a plurality of tuples, wherein each tuple represents a combination of possible values of different attributes. The test space of the SUT is defined based on attributes, each having a set of possible values. The functional coverage model defines a portion of the complete Cartesian product of values of attributes. The portion may be defined using exclusion rules (e.g., when a first attribute, such as the SUT is executed on a specific Operating System (e.g., Linux™), a second attribute, such as an internet browser cannot be of one or more types (e.g., Microsoft© Internet Explorer©)), using inclusion rules (e.g., a certain combination of values of attributes is valid), explicitly (by defining the set of possible valid combinations), using a combination thereof or the like.

An n-wise coverage combination metric is a number, portion or a similar empirical value, representing how many of the n-wise combinations of the state space defined by the functional coverage model is required to be covered. In some exemplary embodiments, a pair-wise requirement may be that 100% of all two valid combinations of values of any two attributes are covered. In some exemplary embodiments, a different measurement, lower than 100%, may be required to be covered. Additionally, or alternatively, the n-wise requirement may be measured with respect to a pair-wise coverage, a three-wise coverage, a four-wise coverage, or the like.

The n-wise coverage combination metric is considered useful as statistics show that most bugs depend on the interaction between the values of a small number of parameters in order to have their effect appear (n-wise interaction). The entire test space defined by the functional coverage model is usually much larger than a test space in which 100% of all pairs, triplets, quadruplets, or the like are required to be covered. Further, when developing a test plan for a SUT, there are often many facets that are tested in parallel. In many cases, these various facets typically have overlapping coverage of the SUT to certain degree. Therefore, a significantly smaller number of tests may be used, and the reduced number of test is likely to find most, if not all, of the bugs in the SUT. It will be noted that the disclosed embodiments of the present invention are not dependent on the above-mentioned premise and may be useful even in the case that the premise is refuted.

One technical solution may be to determine a set of common attributes between two or more functional coverage models, each model defining the test space that is covered by a test suite. Based on this determination of a portion of valid combinations of common sets of attributes (and therefore redundant potential tests), a test selection may be performed. The test selection may be performed so as to find a concentrated unique set of tests to run to increase the efficiency of a test suite with respect to the valid test space. The test selection may be performed by selecting a subset of the tests that would cover a shared set of attributes between two or more functional coverage models, and therefore reducing the chances of overlap between various tests with respect to the valid test space.

Another technical solution is to utilize Combinatorial Test Design (CTD) to determine a set of sufficient tests. Instead of using the CTD method for test planning, the disclosed subject matter utilizes the CTD method for test selection. A CTD tool is given a description of a test space in the form of variables, their respective values, and possibly restrictions on the values combinations. In some exemplary embodiments, the CTD tool may be provided with two or more functional coverage models defining the possible test space. CTD may select a subset of the possible tests that ensures coverage of all valid combinations of every common attribute (between the functional coverage models). Many tools and algorithms exist for CTD as is disclosed in Grindal, M., Offutt, J., Andler, S. F. "Combination testing strategies: a survey". Softw. Test, Verif. Reliab 15(3), 167-199 (2005), and the disclosed subject matter may utilize any of one of them. The CTD may be utilized with respect to the covered test space so as to determine whether a reduced number of tests would still achieve 100% n-wise coverage of the covered test space.

Yet another technical solution is to determine a complementary functional coverage model defining the complementing set of attributes that may be tested by the test suite. Using CTD, requirements for a complementary test suite may be determined. Based on the requirements, the complementary test suite may be manually designed, automatically generated, or the like. A comprehensive test suite comprising both the reduced test suite and the complementary test suite ensures improved efficiency.

Typically, a test environment in which to test the SUT when deployed on a target device includes multiple resources. For example, when the target computing device is a network device to be deployed within a packet-based network, the test environment may include one or more computing devices that can be configured to simulate one or more "test beds." These test beds may each represent a particular test scenario with respect to emulated network configurations. A testing team may design test cases that utilize these test beds to test a particular functionality or behavior of the software when executed by the target network device with respect to the requirements of the particular network configuration. One test case, for example, may test the functionality of the SUT related to establishing a communication session and communicating data by way of the communication session. When executing the test plan for the SUT, the resources available in the test environment (such as time, processors, test beds, and the like) may be in limited supply.

One technical effect of utilizing the disclosed embodiments is a reduction in size of a test suite so as to allow more efficient legacy testing. Another technical effect is reusing tests. Reuse of a test may be important in cases where a test was deemed useful (e.g., it exhibited a special behavior). Reuse of a test may be important in cases where test design is performed at least partly manually or otherwise consumes resource (e.g., long generation times). Yet another technical effect is to enable significant reduction of the tests to be run, while preserving the same bug detection as the original test suite with high confidence. The potential reduction is much greater than the one achieved by simply preserving the same functional coverage, while the risk of bug escaping is very low, based on current CTD statistics.

In some exemplary embodiments, the disclosed method includes defining the test space in the form of variables and their respective values. This step may define the dimensions of the functionality that is important for the tests to cover. The definition may be given using two or more functional coverage models. Next step includes mapping the existing tests of the test suites to the test space. In some exemplary embodiments, each existing test is mapped to a list of pairs (variable, value). This step can already reveal redundant tests, i.e., tests that map to exactly the same list of pairs. The mapping may provide a functional coverage model of a reduced state space (i.e., covered state space). The step of determining common attributes between functional models by applying two or more functional coverage models to a CTD algorithm is performed next. The CTD algorithm may select a subset of the tests that cover all sets of attributes shared between the applied functional models. The result of the CTD algorithm is mapped back to the existing test cases. The subsets of existing test cases define reduced test suites having a reduced number of tests with respect to the original test suites. In some exemplary embodiments, the reduced test suites eliminate redundant tests to cover all common sets of attributes.

Figure 1B:
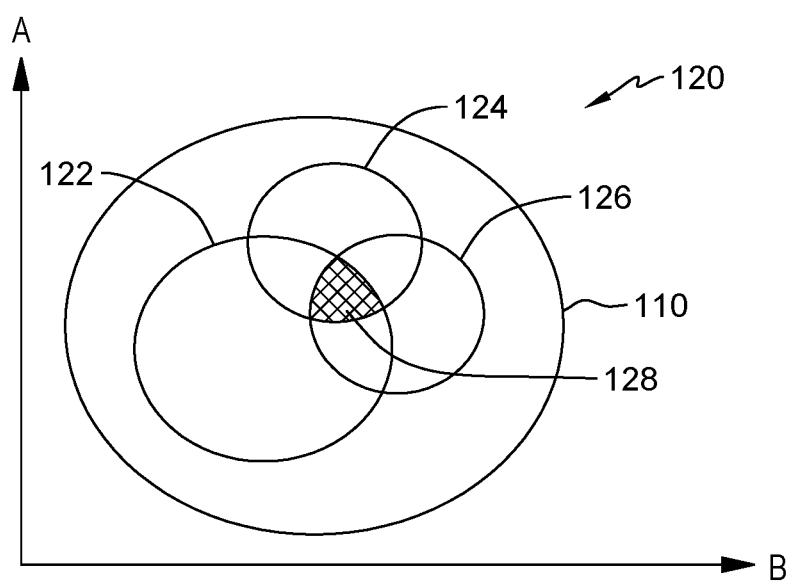

Referring now to FIGS. 1A-1B diagrams of test spaces defined by various functional coverage models, in accordance with some exemplary embodiments of the present invention.

Diagrams 100 and 120 show a simplified illustration of test spaces. In these examples there may be sets of shared functional attributes. Sets of attributes A and B, represented by the x-axis and y-axis, may receive different values. It will be noted that the disclosed embodiments are not limited to a specific number of attributes. The values of the attributes may be of different types (e.g., enumerations, scalars, real numbers or the like). Specifically, the values may be discrete. It will be further noted that the shape of the different spaces in the diagrams are exemplary and the disclosed embodiments are not limited to them.

A point in the space defined by the axis, such as point 102, is a combination of values of the shared attributes. A portion of the space is a valid portion 110 comprising all valid combinations of all attributes that may be exhibited by the SUT. The valid portion 110 is illustrated as a portion of the space having no specific shape. Point 104 is a valid possible combination, and therefore may be tested. Potentially, the valid portion 110 should be tested in order to ensure no bugs exist. The valid portion 110 may include one or more sub-portions 106 and 108 having no specific shape. A first sub-portion 106 may represent a sub-portion of the valid portion 110 of the test space covered by a first test suite as defined by a first functional model, while a second sub-portion 108 may represent a sub-portion of the valid portion 110 of the test space covered by a second test suite as defined by a second functional model. In various embodiments of the present invention, sub-portions of the valid portion 110 of the test space may overlap. Region 112 shown in FIG. 1A represents such overlap. In other words, the region 112 represents the test space that covers a set of attributes shared between the first functional model and the second functional model. Region 112 represents a subset of the first sub-portion 108 and the second sub-portion 108.

In diagram 120 of FIG. 1B, another example of a covered test space 128 is shown. In this example, the valid portion 110 may include three sub-portions 122, 124 and 126. The first sub-portion 122 defines functional coverage by a first test suite based on a first functional coverage model, the second sub-portion 124 defines functional coverage by a second test suite based on a second functional coverage model and the third sub-portion 126 defines functional coverage by a third test suite based on a third functional coverage model. The covered test space 128 represents the test space that covers a set of attributes shared between the first, second and third functional coverage models. As can be appreciated, the covered test space 128 is a (strict) subset of the valid portion 110.

In case the CTD is performed with respect to the covered test spaces 112, 128, each possible shared attribute is covered by at least one test in the test suite. Therefore, the CTD may be utilized to define a sufficient subset of the respective test suites, also referred to as reduced test suites, that would cover all common attributes between two or more functional coverage models.

In some exemplary embodiments, a complementary test space (not shown in FIGS. 1A and 1B) may be defined by excluding from the valid portion 110 the covered test spaces 112 and 128. CTD may be used with respect to the complementary test space so as to be utilized for designing/generating tests that would increase coverage of the test suite. A comprehensive test suite comprising both the reduced test suites and the designed/generated tests (e.g., regression tests) may be used. The comprehensive test suite may provide better coverage than any of the original test suites but reuses the tests of the test suite(s).

Figure 2:
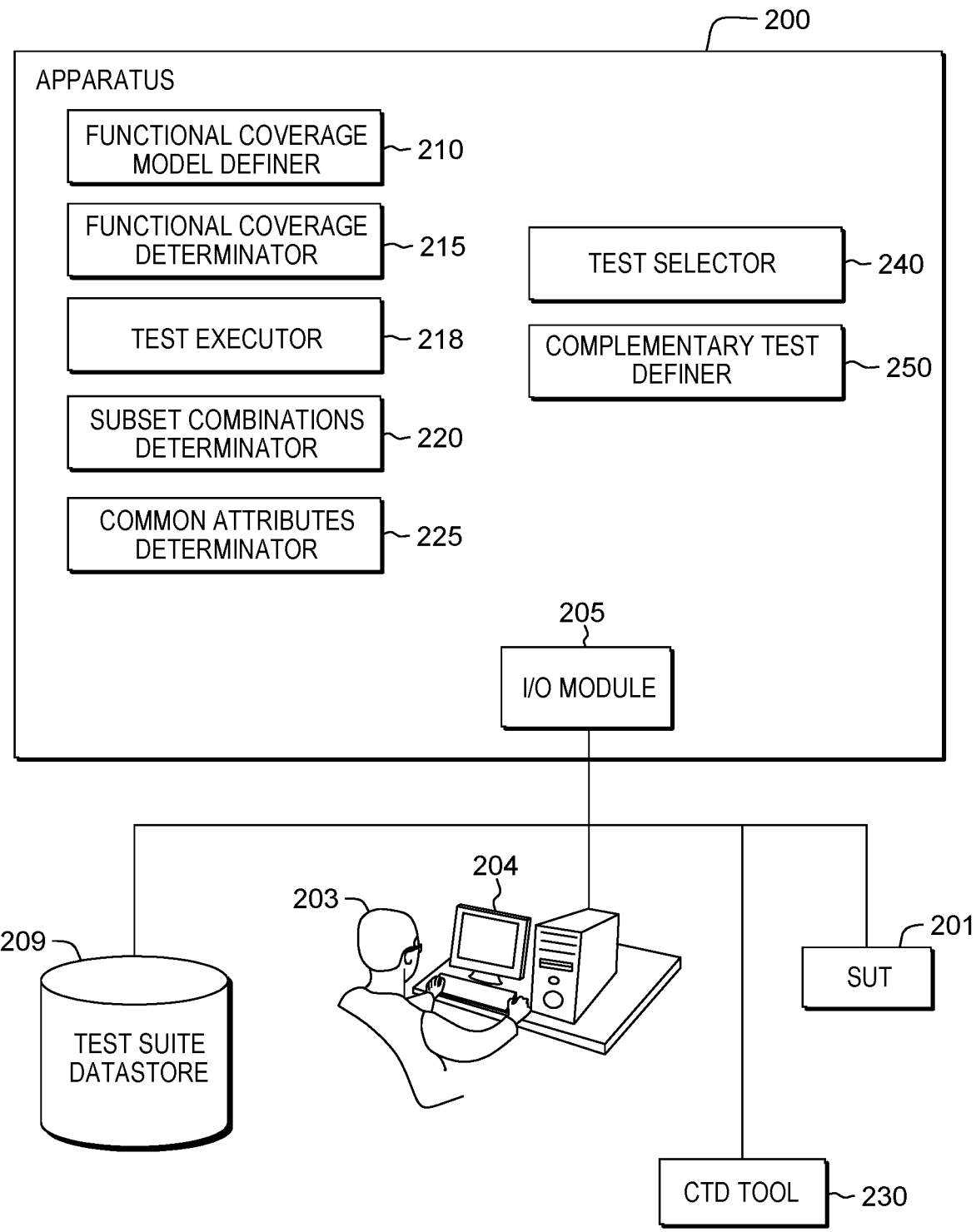
FIG. 2 shows a block diagram of an apparatus, in accordance with some exemplary embodiments of the present invention.

Referring now to FIG. 2 showing an apparatus in accordance with some exemplary embodiments of the present invention. An apparatus 200 may be configured to perform test selection in accordance with the disclosed embodiments of the present invention. Additionally or alternatively, the apparatus 200 may provide a comprehensive test suite reusing the tests selected in the test selection.

In some exemplary embodiments, a functional coverage model definer 210 may be operative to define a plurality of functional coverage models of a SUT 201. The functional coverage models may be defined so as to define the covered test space(s) with respect to a test suite(s) (e.g., 106 and 108 of FIG. 1A). The functional coverage model definer 210 may define the attributes of the functional coverage models based on values received from a user 203, for example.

In some exemplary embodiments, the functional coverage model definer 210 may determine the functional coverage models based on an initial functional coverage model by excluding combinations of values which are not covered by the test suite(s).

In some exemplary embodiments, a functional coverage determinator 215 may be configured to determine functional coverage by each test of each test suite. Each test may be associated with a tuple representing a functional coverage task that was covered by the test. In some exemplary embodiments, the functional coverage may be determined based on an execution of the test suite(s) on the SUT 201, which may be performed by a test executor 218. Based on the execution, coverage may be determined, such as for example by monitoring the execution on-the-fly, by reviewing log files, or the like.

In some exemplary embodiments, a subset combinations determinator 220 may be operative to determine a subset of the possible combinations of values. The subset of the possible combinations of values is with respect to the covered test space defined by the functional coverage models determined by the functional coverage model definer 210. The subset may be characterized in covering substantially all combinations of all common attributes. In some exemplary embodiments, the common attributes coverage determination may be obtained by a common attributes determinator 225. In some exemplary embodiments, the common attributes coverage may comprise a plurality of different combinations with respect to different sets of common attributes shared by two or more functional coverage models.

In some exemplary embodiments, the common attributes determinator 225 may be configured to utilize a CTD tool 230. The CTD tool may be an internal module (not shown) or an external module as exemplified in FIG. 2. The CTD tool 230 may be operative to determine the subset of combinations based on the provided functional coverage models using CTD algorithms, as are known in the art.

In some exemplary embodiments, a test selector 240 may be configured to select a subset of the test suite(s). The subset of the test suite(s), which is referred to as the reduced test suite, comprises tests from the test suite that cover the subset defined by the subset combinations determinator 220. The test selector 240 may determine which test to select based on a mapping between tests of the test suite(s), and attributes associated with each of the functional coverage models, such as for example the mapping determined by the functional coverage determinator 215.

In some exemplary embodiments, a complementary test definer 250 may be configured to generate a set of test requirements that are sufficient to cover all combinations of all common attributes that are not covered by the reduced test suite and are valid combinations. The complementary test definer 250 may determine a complementary functional coverage model corresponding to the complementary test space, and using the CTD tool 230 or other methods, to determine a testing plan ensuring that the tests cover substantially all common attributes within the complementary test space.

In some exemplary embodiments of the disclosed invention, the apparatus 200 may comprise an Input/Output (I/O) module 205. The I/O module 205 may be utilized to provide an output to and receive input from the user 203. The I/O module 205 may be used to connect to a test suite datastore 209 (such as retained in a Network-Attached Storage (NAS), Hard Drive, Flash drive, memory, or a similar storage device). The datastore 209 may retain one or more test suites of the SUT 201. The I/O module 205 may be useful for connecting to the SUT 201, such as for executing the SUT 201 with respect to tests retained in the test suite datastore 209. The I/O module 205 may be utilized to connect to an external CTD tool 230. In some exemplary embodiments, an internal CTD tool may be used additionally or alternatively.

In some exemplary embodiments, the user 203 may interact with the apparatus 200 using a Man-Machine Interface (MMI) 204 such as a terminal, a display, a keyboard, an input device or the like. The user 203 may define the tests to be used in respect to the SUT 201. The user 203 may provide rules, commands, preferences, and parameters to the apparatus 200. The user 203 may view the output of the apparatus 200.

Figure 3:
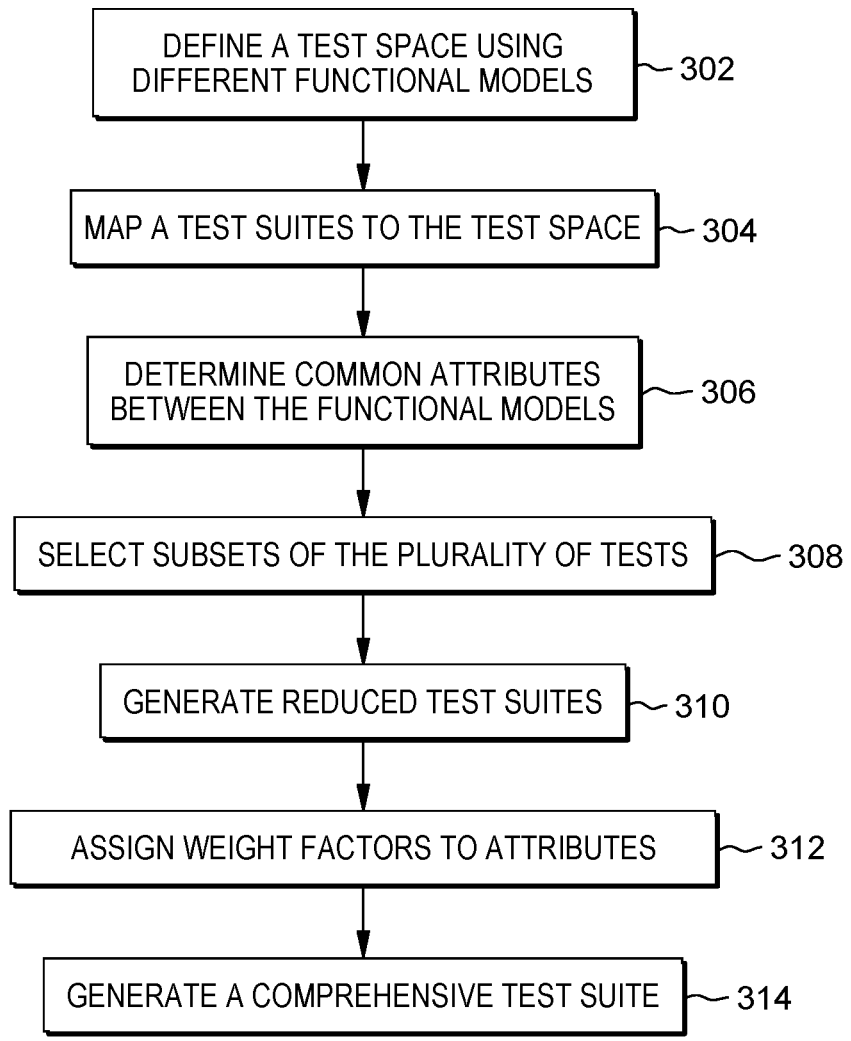
FIG. 3 shows a flow diagram of a method for test space analysis across multiple models, in accordance with some exemplary embodiments of the present invention.

Referring now to FIG. 3, a flowchart diagram of a method in accordance with some exemplary embodiments of the disclosed subject matter is shown.

In step 302, a test space may be defined using one or more functional coverage models. Each of the functional coverage models defines a plurality of attributes and their values. A first functional coverage model defines functional coverage by a first test suite, a second functional coverage model defines functional coverage by a second test suite, and so on. The functional coverage models may be provided by the user.

In step 304, test suites may be mapped to the test space to determine a covered test space by mapping each test to a corresponding point in the space, such as point 104. The mapping may be performed by the functional coverage determinator 215. Additionally or alternatively, mapping may be performed manually.

In step 306, a set of common attributes between two or more functional coverage models may be determined based on the coverage of the respective test suites. The set of common attributes may be determined by the common attributes determinator 225 which may utilize the CTD tool 230. In this step, functional coverage corresponding to common attributes may also be determined. This functional coverage may correspond to the covered test space 112, 128 shown in FIGS. 1A and 1B. Advantageously, mapping a commonly used set of attributes between two or more functional coverage models enables identification and analysis of areas where various CTD models can be tuned to increase efficiency of the covered test space.

In step 308, subsets of the corresponding test suites are selected based on the common attributes determination of step 306. The test selection may be performed by the test selector 240. According to embodiments of the present invention, the test selector 240 finds a concentrated, unique set of tests to run which increases testing efficiency and allows for adequate opportunities to find errors within the SUT 201. Reduced test suite(s) may be provided in step 310.

Additionally or alternatively, a comprehensive test suite may be provided in step 314 by performing step 312. At step 312, the common attributes determinator 225 may assign a weight value to each attribute (including shared attributes) based on a relative commonality of the attribute. In other words, if two models share a set of attributes and if a new functional coverage model is generated, the complementing set of common attributes in the generated model can be weighted more heavily to reduce the chances of overlap between the new set of tests and the existing set of regression tests in a corresponding test suite.

The regression tests together with the combined reduced test suites determined in step 310 may be considered as a comprehensive test suite and provided in step 314.

Figure 4:
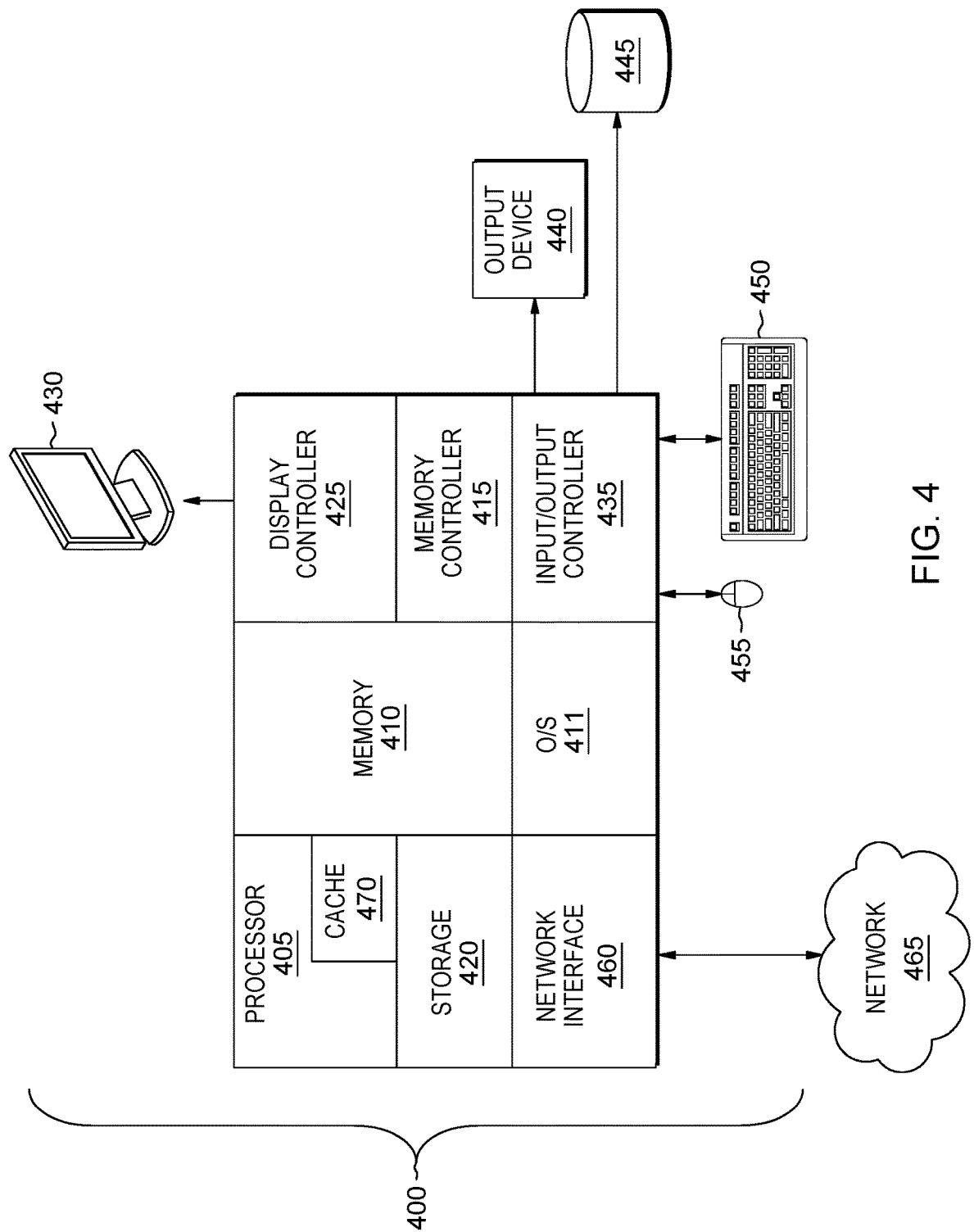
FIG. 4 is a block diagram of an example computer system for implementing some or all aspects of the method for test space analysis across multiple models, in accordance with embodiments of the present invention.

FIG. 4 is a block diagram of a computer system 400 for implementing some or all aspects of the apparatus 200, according to some embodiments of this invention. The apparatus 200 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the functional coverage model definer 210, the functional coverage determinator 215, the test executor 218, the subset combinations determinator 220, the common attributes determinator 225, the test selector 240 and the complementary test definer 250 may each be implemented as a computer system 400 or may run on a computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the apparatus 200 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for identifying optimal tests across multiple functional coverage models, the method comprising:
   connecting inputs to a System Under Test (SUT) as a multitude of attributes, wherein each attribute is eligible to take on a respective one or more attribute values;
   generating a first test suite comprising a first plurality of tests that provides complete pairwise coverage across a first plurality of attributes from the set of attributes, the first plurality of tests is based on a first functional coverage model of the SUT and wherein the first functional coverage model defines a Cartesian product space comprising a multitude of values based on all possible combinations of values of the first plurality of attributes;
   generating a second test suite comprising a second plurality of tests that provides complete pairwise coverage across a second plurality of attributes from the set of attributes, the second plurality of tests is based on a second functional coverage model of the SUT, wherein the second functional coverage model defines a Cartesian product space comprising a collection of all possible combinations of values of the second plurality of attributes;
   determining a first subset of the first plurality of attributes and a second subset of the second plurality of attributes, wherein the first subset of attributes and the second subset of attributes comprise exclusively common attributes between the first plurality of attributes and the second plurality of attributes; and executing a subset of the first plurality of tests and the second plurality of tests, wherein the subset that is selected is operative to cover the first subset of the first plurality of attributes and the second subset of the second plurality of attributes.

2. The method of claim 1, wherein the determining the first subset and the second subset comprises performing Combinatorial Test Design (CTD) with respect to the first functional coverage model and the second functional coverage model.

3. The method of claim 1, further comprising performing coverage analysis on the first test suite and the second test suite so as to determine the common attributes between the first plurality of attributes and the second plurality of attributes.

4. The method of claim 3, wherein performing the coverage analysis comprises executing the first test suite and the second test suite and analyzing results of execution of the first test suite and the second test suite.

5. The method of claim 1, further comprising generating a new test suite comprising the selected subset of the first plurality of tests and the second plurality of tests, wherein the new test suite reuses existing tests from the first test suite and the second test suite.

6. The method of claim 1, wherein the selecting is performed automatically based on a mapping between tests of the first test suite, the first plurality of attributes, the second test suite and the second plurality of attributes.

7. The method of claim 1, further comprising assigning a weight factor to the first subset of the first plurality of attributes and to the second subset of the second plurality of attributes.

8. A system for identifying optimal tests across multiple functional coverage models, the system comprising:

a memory having computer-readable instructions; and one or more processors for executing the computer-readable instructions, the computer-readable instructions comprising:

instructions for connecting inputs to a System Under Test (SUT) as a multitude of attributes, wherein each attribute is eligible to take on a respective one or more attribute values;

instructions for generating a first test suite comprising a first plurality of tests that provides complete pairwise coverage across a first plurality of attributes from the set of attributes, the first plurality of tests is based on a first functional coverage model of the SUT and wherein the first functional coverage model defines a Cartesian product space comprising a multitude of values based on all possible combinations of values of the first plurality of attributes;

instructions for generating a second test suite comprising a second plurality of tests that provides complete pairwise coverage across a second plurality of attributes from the set of attributes, the second plurality of tests is based on a second functional coverage model of the SUT, wherein the second functional coverage model defines a Cartesian product space comprising a collection of all possible combinations of values of the second plurality of attributes;

instructions for determining a first subset of the first plurality of attributes and a second subset of the second plurality of attributes, wherein the first subset of attributes and the second subset of attributes comprise exclusively common attributes between the first plurality of attributes and the second plurality of attributes; and instructions for executing a subset of the first plurality of tests and the second plurality of tests, wherein the subset that is selected is operative to cover the first subset of the first plurality of attributes and the second subset of the second plurality of attributes.

9. The system of claim 8, wherein the instructions for determining the first subset and the second subset further comprise instructions for performing Combinatorial Test Design (CTD) with respect to the first functional coverage model and the second functional coverage model.

10. The system of claim 8, the computer-readable instructions further comprising instructions for performing coverage analysis on the first test suite and the second test suite so as to determine the common attributes between the first plurality of attributes and the second plurality of attributes.

11. The system of claim 10, wherein the instructions for performing the coverage analysis further comprise instructions for executing the first test suite and the second test suite and analyzing results of execution of the first test suite and the second test suite.

12. The system of claim 8, the computer-readable instructions further comprising instructions for generating a new test suite comprising the selected subset of the first plurality of tests and the second plurality of tests, wherein the new test suite reuses existing tests from the first test suite and the second test suite.

13. The system of claim 8, wherein the instructions for selecting the subset are performed automatically based on a mapping between tests of the first test suite, the first plurality of attributes, the second test suite and the second plurality of attributes.

14. The system of claim 8, the computer-readable instructions further comprising instructions for assigning a weight factor to the first subset of the first plurality of attributes and to the second subset of the second plurality of attributes.

15. A computer-program product for identifying optimal tests across multiple functional coverage models, the computer-program product comprising a computer-readable storage medium having program instructions embodied therewith, the program instructions executable by a processor to cause the processor to perform a method comprising:

connecting inputs to a System Under Test (SUT) as a multitude of attributes, wherein each attribute is eligible to take on a respective one or more attribute values;

generating a first test suite comprising a first plurality of tests that provides complete pairwise coverage across a first plurality of attributes from the set of attributes, the first plurality of tests is based on a first functional coverage model of the SUT and wherein the first functional coverage model defines a Cartesian product space comprising a multitude of values based on all possible combinations of values of the first plurality of attributes;

generating a second test suite comprising a second plurality of tests that provides complete pairwise coverage across a second plurality of attributes from the set of attributes, the second plurality of tests is based on a second functional coverage model of the SUT, wherein the second functional coverage model defines a Cartesian product space comprising a collection of all possible combinations of values of the second plurality of attributes;

determining a first subset of the first plurality of attributes and a second subset of the second plurality of attributes, wherein the first subset of attributes and the second subset of attributes comprise exclusively common attributes between the first plurality of attributes and the second plurality of attributes; and executing a subset of the first plurality of tests and the second plurality of tests, wherein the subset that is selected is operative to cover the first subset of the first plurality of attributes and the second subset of the second plurality of attributes.

16. The computer-program product of claim 15, wherein the determining the first subset and the second subset comprises performing Combinatorial Test Design (CTD) with respect to the first functional coverage model and the second functional coverage model.

17. The computer-program product of claim 15, the method further comprising performing coverage analysis on the first test suite and the second test suite so as to determine the common attributes between the first plurality of attributes and the second plurality of attributes.

18. The computer-program product of claim 17, wherein performing the coverage analysis comprises executing the first test suite and the second test suite and analyzing results of execution of the first test suite and the second test suite.

19. The computer-program product of claim 15, the method further comprising generating a new test suite comprising the selected subset of the first plurality of tests and the second plurality of tests, wherein the new test suite reuses existing tests from the first test suite and the second test suite.

20. The computer-program product of claim 15, the method further comprising assigning a weight factor to the first subset of the first plurality of attributes and to the second subset of the second plurality of attributes.

* * * * *